Figure 1:
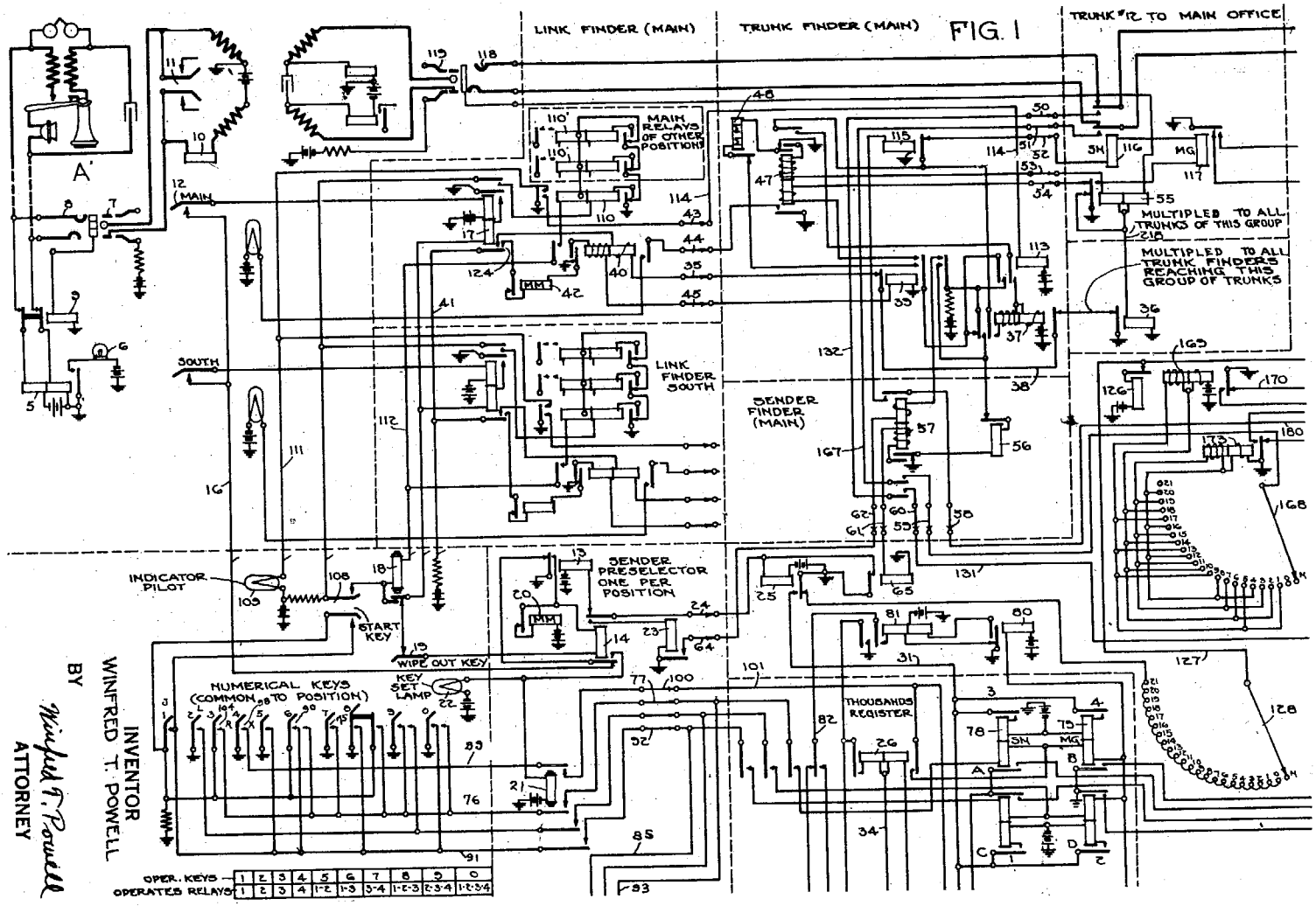

Oct. 21, 1930. W. T. POWELL Re. 17,839

INTEROFFICE TRUNKING SYSTEM

Original Filed Dec. 4, 1920 4 Sheets-Sheet 1

INVENTOR
WINFRED T. POWELL

BY Winfred T. Powell
ATTORNEY

Oct. 21, 1930. W. T. POWELL Re. 17,839

INTEROFFICE TRUNKING SYSTEM

Original Filed Dec. 4, 1920 4 Sheets-Sheet 2

INVENTOR
WINFRED T. POWELL

BY Winfred T. Powell
ATTORNEY

Oct. 21, 1930. W. T. POWELL Re. 17,839

INTEROFFICE TRUNKING SYSTEM

Original Filed Dec. 4, 1920 4 Sheets-Sheet 3

INVENTOR
WINFRED T. POWELL

BY Winfred T. Powell
ATTORNEY

INTEROFFICE TRUNKING SYSTEM

Original Filed Dec. 4, 1920 4 Sheets-Sheet 4

INVENTOR
WINFRED T. POWELL

BY Winfred T. Powell
ATTORNEY

Reissued Oct. 21, 1930 Re. 17,839

UNITED STATES PATENT OFFICE

WINFRED T. POWELL, OF ROCHESTER, NEW YORK, ASSIGNOR TO THE STROMBERG-CARLSON TELEPHONE MANUFACTURING COMPANY, OF ROCHESTER, NEW YORK, A CORPORATION OF NEW YORK

INTEROFFICE TRUNKING SYSTEM

Original No. 1,502,917, dated July 29, 1924, Serial No. 428,225, filed December 4, 1920. Application for reissue filed April 6, 1926. Serial No. 100,191.

This invention relates to telephone systems and more particularly to systems having a plurality of offices or exchanges.

In former telephone systems, when calls originated in one office for a subscriber at a distant office, an operator known as an A operator, connected the answering end of her cord circuit to the line of the calling subscriber and received the designation of the wanted line from this subscriber. The A operator then depressed an office key by which her telephone set was connected to an order wire leading to the distant wanted office over which wire the A operator repeated the number of the wanted subscriber to a B operator at the distant office who assigned a trunk for use in completing this call.

The A operator then inserted the calling end of her cord circuit into the jack of the assigned trunk. The B operator after receiving the number of the wanted line proceeded to test this line and, if idle, inserted the calling end of her cord circuit into the multiple jack of the wanted line and signalled the wanted subscriber. The use of such an order wire has resulted in much delay, and great confusion resulting from the errors due to repeating the number thereover.

The present invention has for its purpose the elimination of the order wire and provides in its stead automatic means for assigning an idle trunk to the distant office as the result of the operation of an office key and automatic means indicates visually the designation of the automatically selected trunk, so that the A operator can connect the calling end of her cord circuit to the assigned trunk. At the distant office the B operator is informed of the number of the wanted line by means of signals variably operated from the A operator's position.

The main feature of this invention is the arrangement of circuits for the manual interconnection of subscriber's lines terminating at different exchanges or offices without the use of the so-called order or instruction telephone circuits between the operators at said exchanges.

Another feature of this invention is the provision of means for automatically assigning an idle trunk to a wanted exchange in response to the operation of a key individual to said office and means for automatically indicating the trunk assigned.

Another feature of the invention resides in the means for registering the designation of a wanted line on registering means located at one office and for automatically repeating such registration at a distant office to variably and selectively actuate indicating means at the distant office.

Other features will appear from the detailed description and appended claims.

Figure 3:
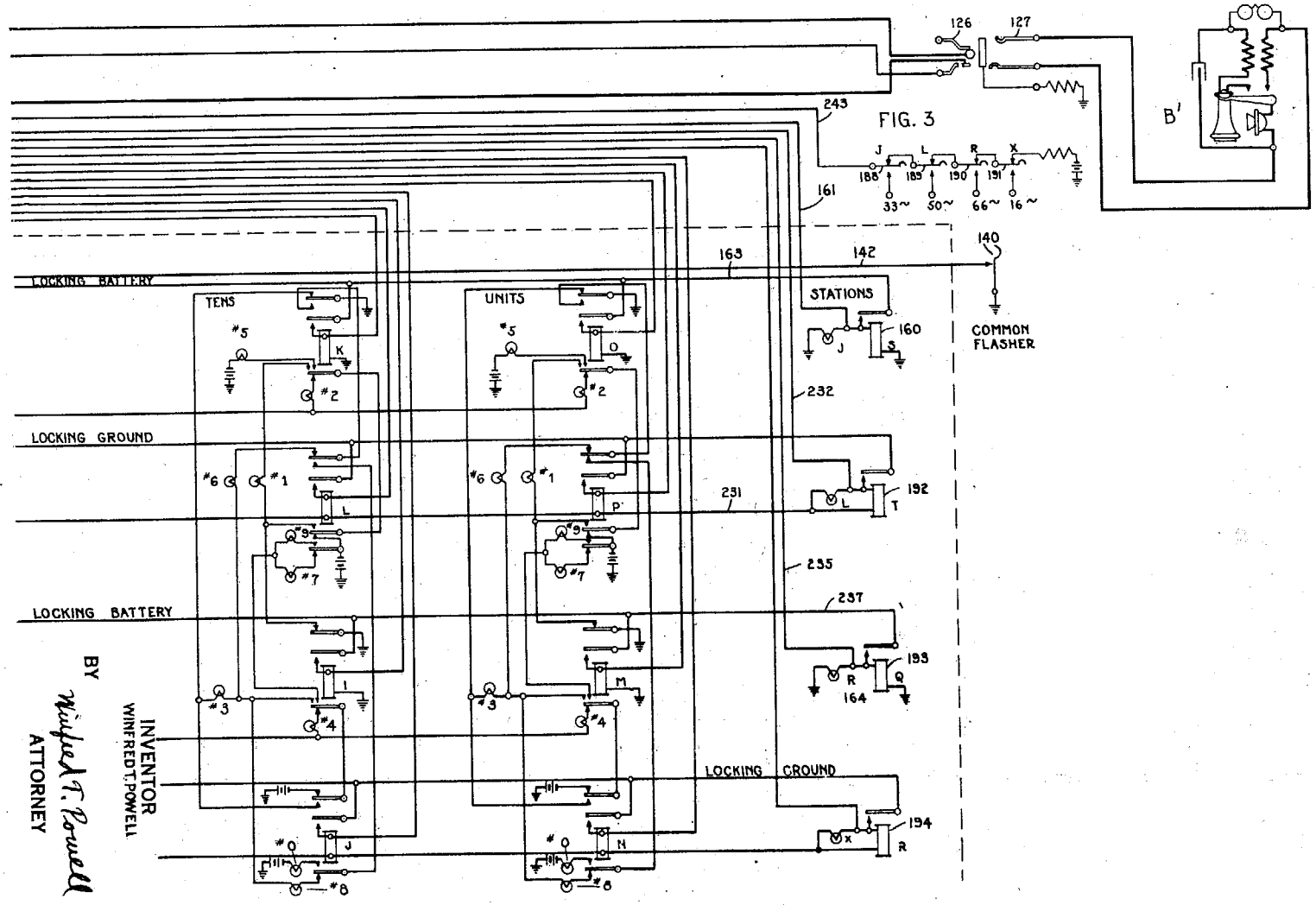
Figure 4:
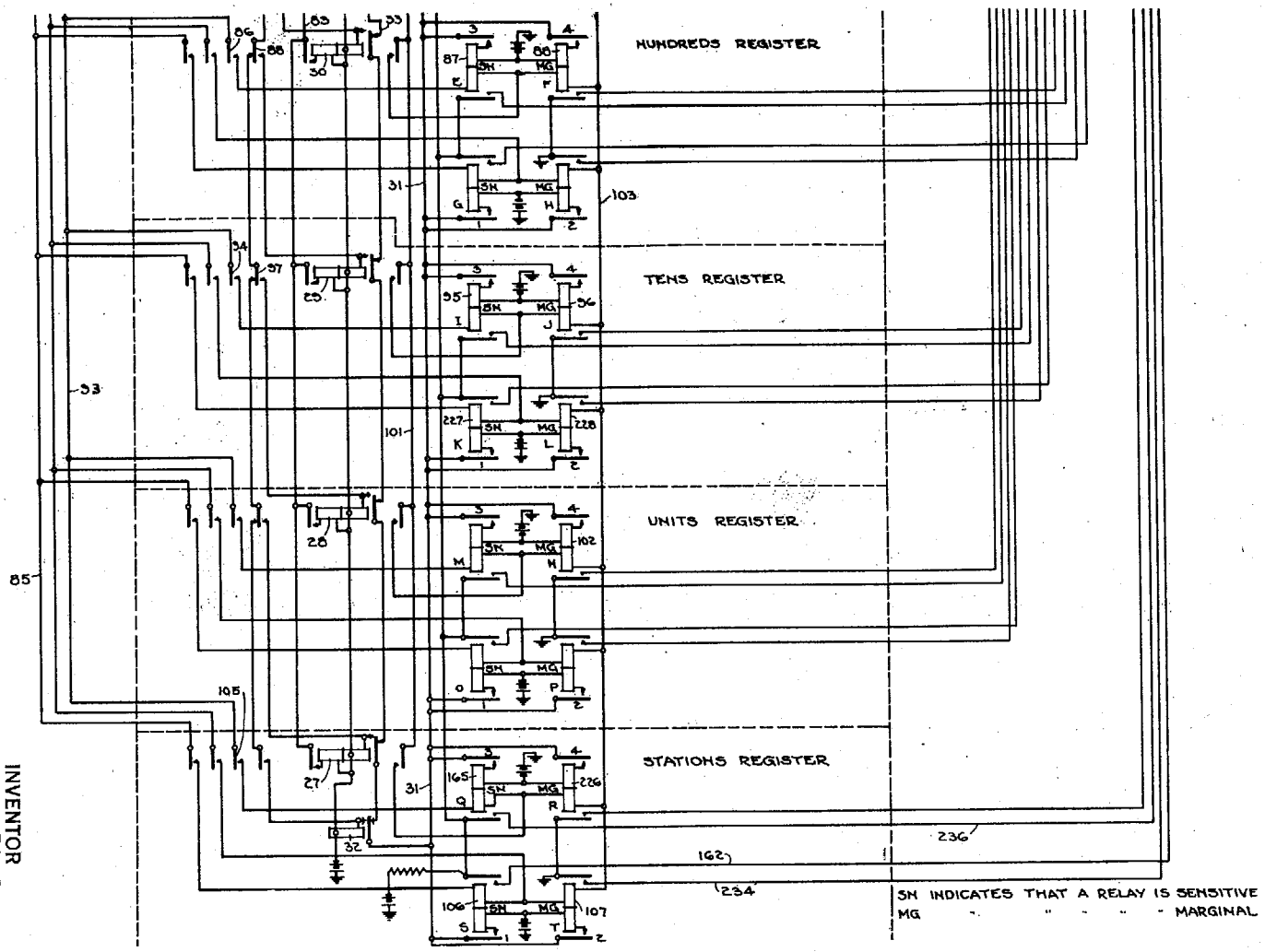

The drawings, with Figures 1, 2 and 3 arranged in the order named and with Fig. 4 placed below Figs. 1 and 2 so that the lines thereof meet, diagrammatically represent a portion of a telephone system employing the present invention. The circuits shown on Fig. 1 and at the left of the heavy dashed line of Fig. 2 and the circuits of Fig. 4, represent a portion of the equipment located at one office while that portion of the drawings at the right of the heavy dashed line of Fig. 2 and those shown in Fig. 3 represent the circuits of a second office. At the upper left hand corner of Fig. 1 there is represented the sub-station circuits of a calling subscriber as well as a portion of an A operator's cord circuit. At the lower left hand corner of Fig. 1 there is represented a set of ten numerical keys and it is to be understood that there is one set of these keys at each operator's position. At the middle and upper portion of the sheet of Fig. 1 there is represented a switch referred to as a link finder of which there is one such switch for each office key at each operator's position. At the center and right of Fig. 1 there is represented a trunk finder switch and a sender finder switch, the brushes of which are connected together by a circuit referred to as a link circuit which link is located by the link finder. The trunk finder functions to select any idle one of a group of trunks to the wanted office, while the sender finder locates a sender of the common group of senders which has been preselected by a preselector switch shown at the bottom of Fig. 1. At the lower right hand corner of Fig. 1 and the left-hand corner of Fig. 2 there is represented a progressively movable switch, herein referred to as a sender switch, while in the lower part of Fig. 1 and in Fig. 4 there are shown the relay registers for storing up the designation of the thousands, hundreds, tens, units and station's designation. At the upper left-hand corner of Fig. 2 is shown a portion of an indicating board common to a plurality of operator's positions and of which there is one such board for each office reached from the first mentioned office. On this board there are located a plurality of lamps for indicating the tens and units designation of an automatically assigned trunk to a wanted office. At the center of Fig. 2 there appears a progressively movable switch, herein referred to as a receiver switch and at the upper portion of Figs. 2 and 3, there appears a representation of the B operator's cord circuit, while at the lower part of Figs. 2 and 3 there is represented the line indicator lamps and the relays for controlling the same.

Figure 2:
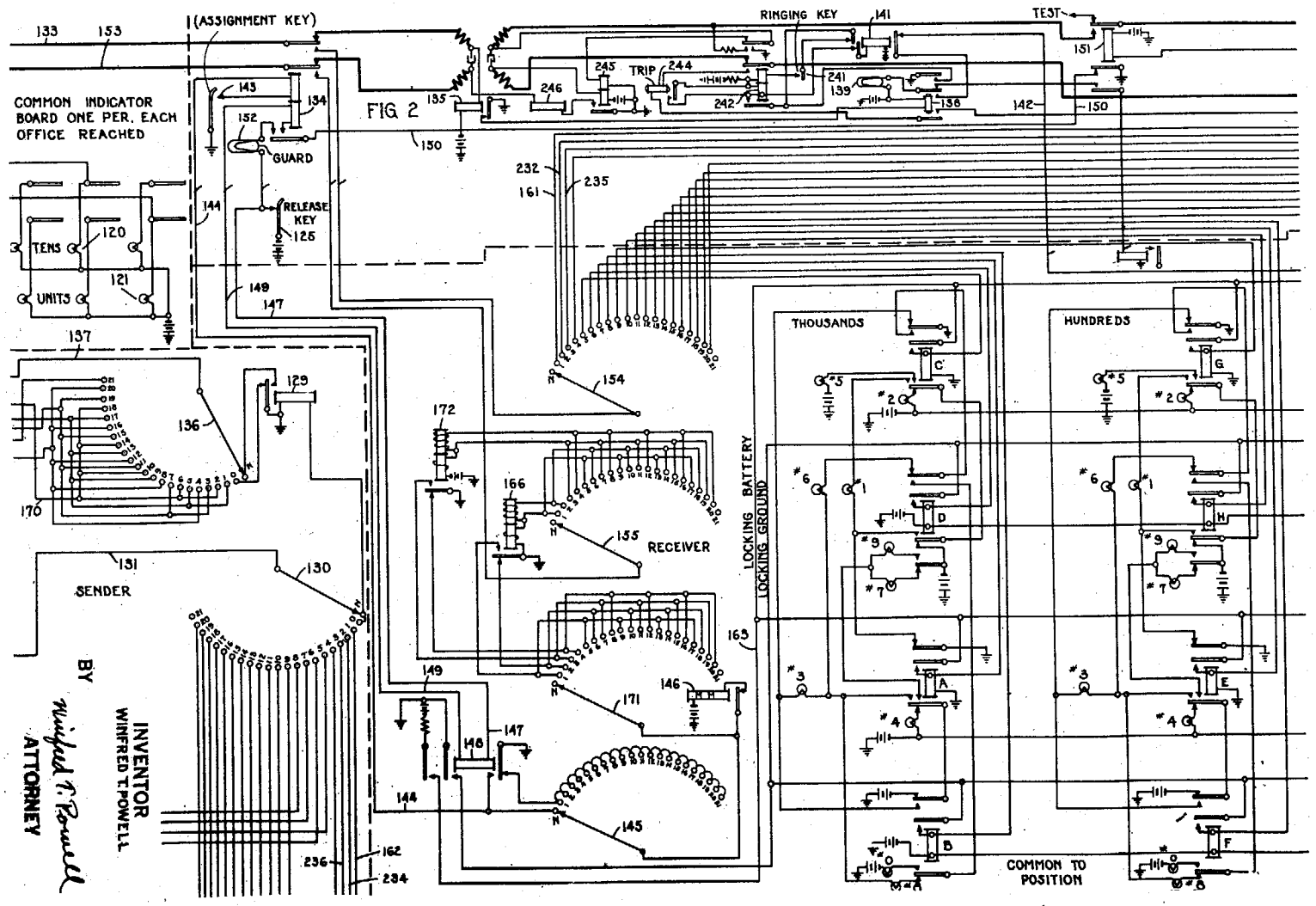

It will be understood that the number of trunks such as that shown at the upper portion of Figs. 1 and 2 will vary in accordance with the traffic between the various offices, similarly the number of senders for the use of all A operators' positions located at the same office will depend on the number of simultaneous calls therefrom.

It is believed that the invention will best be understood by describing the method of operation employed in establishing a telephone connection from the sub-station of a calling subscriber indicated at "A" to the sub-station of a wanted subscriber, "B", whose telephone line terminates in another exchange herein designated "Main". When the calling subscriber removes his receiver from its switch hook, the line relay 5 is operated in the well known manner to light the line lamp 6. The "A" operator then inserts the plug 7 into the multiple jack 8 of the calling line which is effective to operate the cut-off relay 9 and this relay in turn disconnects the line relay 5 to extinguish the line lamp 6. The answering supervisory relay 10 of the cord circuit taken for use is also operated in this portion of the operator's cord circuit which is not shown complete, since it may be of any well known arrangement. The "A" operator's telephone set (not shown) is then connected to the calling line, either manually by listening key 11, as indicated, or it may be connected to the calling line through the operation of well known automatic connecting means so that the operator may inquire the designation of the wanted subscriber's line.

For purposes of this description, it has been assumed that the line of the wanted subscriber terminates at the "Main" exchange and that its designation is 7764—R. The "A" operator then presses the office key of the "Main" office, herein designated 12, which is effective to close a circuit from ground at the armature and back contact of relay 13, lower armature and back contact of relay 14, conductor 16, contacts of the office key 12, upper winding of relay 17 to grounded battery. The relay 17 attracts its armature as the result of the closure of this circuit and closes a locking circuit for itself from ground at its inner upper armature and front contact, its lower winding, continuity spring and contact of relay 18, contacts of wipe-out key 19, winding of relay 14, armature, back contact and winding of the motor magnet 20 of the sender preselector to grounded battery.

The motor magnet will not operate in series with the mentioned relays, but the relay 14 is actuated and the relay 17 is held operated in the last described circuit. As soon as relay 14 operates, it closes multiple actuating circuits for relay 21 which connects the operator's numerical key set to the preselected sender and the key set lamp 22 which indicates this connection. These circuits extend from grounded battery, winding of relay 21, lower front contact and armature of relay 14, back contact and armature of relay 13 to ground. The lighting of the key set lamp 22 indicates to the operator that the digits keys appearing at the lower left-hand corner of Figure 1 may be operated in accordance with the designation of the wanted number. The operation of relay 14 also closes a circuit for actuating relays 23 and 25 in series, this circuit extending from ground, winding of relay 23, upper front contact and armature of relay 14, sender preselector brush 24 and winding of relay 25 to grounded battery. The operation of relay 25 closes at its armature and front contact, a circuit from ground over conductor 31, armature and back contacts of relay 32 and the switching relays 27, 28, 29 and 30 of the stations, units, tens and hundreds registers, over conductor 33, right-hand winding of the thousands register switching relay 26, conductor 34, to grounded battery for actuating relay 26.

When relay 17 attracts its armatures, the operating and test circuits of the link finder, individual to the group of trunks assigned to the "Main" office, are closed. The operating circuit for the link finder is closed from grounded battery, resistance, armature and contact 124 of relay 17, back contact, armature and winding of motor magnet 42, continuity spring and back contact of relay 40 to ground, and advances the link finder brushes until an idle link circuit is reached whereupon the test circuit is completed from ground at the make-busy relay 36, right-hand back contact and armature of relay 37, conductor 38, back contact and armature of relay 39, test brush 35, right-hand winding of relay 40, front contact and armature of relay 17, conductor 41, resistance to grounded battery. This last named circuit is effective to shunt the motor magnet 42 of the link finder which then stops its brushes 43, 44, 35 and 45 in engagement with the terminals of an idle link circuit. The relay 40 is operated in the last described circuit and closes a locking circuit for itself from ground, winding of relay 39, holding brush 45 of the link finder, left-hand high resistance winding of relay 40, its inner armature and continuity spring, winding of the motor magnet 42, its armature and back contact, lower front contact 124 and armature of relay 17, conductor 41 and resistance to grounded battery. The operation of relay 39 renders the chosen link unselectable.

Also when the relay 39 is operated, it closes operating circuits for the trunk finder switch and for the sender finder switch, the first of these switches being advanced in a circuit completed from ground, upper contact and continuity spring of relay 47, winding of motor magnet 48 of the trunk finder, its armature and back contact, inner front contact and armature of relay 39, outer back contact and armature of relay 37, through the resistance to grounded battery. Under the control of this circuit, the trunk finder switch advances its brushes 50, 51, 52, 53 and 54, until its test brush 54 engages a test terminal having ground potential applied at the left-hand armature and back contact of relay 55 whereupon the circuit is closed through the lower winding of relay 47, front contact and armature of relay 39, back contact and armature of relay 37, resistance to grounded battery.

This circuit is effective to stop the trunk finder and also to energize the relay 47 which thereupon closes a locking circuit for itself from ground at the armature and back contact of a relay similar to 55 at another trunk over the multiple connection 218, left-hand winding of relay 55, holding brush 53, high resistance winding of relay 47, its upper armature and continuity spring, winding of motor magnet 48, its armature and back contact, to grounded battery through the contacts and armatures of relays 39 and 37, as previously described.

In the event that all the trunks leading from the terminals of a trunk finder are busy, all the relays such as 55 of this group of trunks will be operated, thus removing the short-circuit from the common make-busy relay 36, permitting this last named relay to operate and disconnect the stopping ground potential from all the test terminals at the link finder switches, thus preventing any link finder from selecting a link circuit having no available outgoing trunk at the trunk finder switch.

The operating circuit of the sender finder is traceable from grounded battery through the resistance, outer right-hand armature and front contact of relay 39, back contact, armature and winding of the motor magnet 56 of the sender finder, continuity spring and contact of relay 57 to ground. This last described circuit causes the motor magnet 56 of the sender finder to advance brushes 58, 59, 60, 61 and 62 of this switch until it reaches the same sender to which the key set is connected by way of the preselector switch. At this time, ground at the armature and front contact of relay 23 is extended through brush 64 of the sender preselector, test brush 62 of the sender finder, upper winding of relay 57, outer right-hand front contact and armature of relay 39 and resistance to grounded battery. The relay 57 is thus actuated and at its lower contact and continuity spring opens the energizing circuit of the motor magnet 56 and instead closes a circuit from grounded battery, outer armature and front contact of relay 37, back contact armature and winding of motor magnet 56, continuity spring and armature of relay 57, through the high resistance winding of this relay, holding brush 61 of the sender finder, winding of relay 65 to ground. The operation of relay 65 closes an actuating circuit for relay 25 and simultaneously applies ground potential to the sender preselector brush 24 thereby short-circuiting the relay 23 to remove the stopping ground potential from this terminal of the sender finders thus making this sender busy. It will be seen that the relay 25 will remain operated as long as the relay 65 attracts its armature and thus controls the locking ground for the relay registers and also controls the release of the step-by-step sender.

It will be remembered that earlier in this description it was stated that the relay 21 attracted its armatures to connect the set of numerical keys to the registers. The apparatus is now in condition to receive the designation of the wanted telephone line.

Since it has been assumed that the wanted number is 7764—R, the operator will thereupon depress the No. 7 numerical key of the key set to close a circuit from ground, spring contacts 75, conductor 76, innermost lower armature and front contact of relay 21, brush 77 of the sender preselector switch, left-hand armature and front contact of relay 26, lower winding of the sensitive relay 78 and lower winding of the marginal relay 79, winding of relay 80, to grounded battery. Relays 78, 79 and 80 all operate in series and the first two mentioned relays close locking circuits through their upper windings, front contacts and armatures, through conductor 31, front contact and armature of relay 25, to ground. The operation of relay 80 closes an energizing circuit for the relay 81 from battery, through its right-hand winding and through the armature and continuity spring of relay 80, to ground. Relay 81 then closes a locking circuit through the left winding of relay 26 to grounded battery over conductor 34. When the No. 7 key is released, relay 80 retracts its armature and thereby closes a holding circuit for relay 81 which extends from ground at the continuity spring and contact of relay 80, left-hand winding, front contact and armature of relay 81, armature 82 and front contact of relay 26, right-hand winding of the hundreds register switching relay 30 to grounded battery for operating this relay. The primary locking circuit for relay 30 extends from grounded battery, left-hand winding, front contact and armature of relay 30, conductor 83, to ground at armature and contact of relay 81. The relay 30 on operating closes a second locking circuit for itself from grounded battery, through its right-hand winding, front contact and armature and through the back contacts and armatures of relays 29, 28, 27 and 32, over conductor 31 to the holding ground at the armature and front contact of relay 25. This last described circuit also is effective to short-circuit the left-hand winding of relay 81, so that this last named relay deenergizes and retracts its armatures. The deenergization of relay 81 opens the holding circuit for the thousands register switching relay 26 which extended through the left-hand winding, front contact and armature, to ground at relay 81. The switching relay 26 thereupon deenergizes and disconnects the thousands register relays from the control of the numerical key set, but relay 30 has already extended this key set to the four relays of the hundreds register. Since the hundreds digit of the wanted number is 7, the operator again depresses key No. 7 to close a circuit from ground, key contact 75, conductor 76, inner lower armature and front contact of relay 21, sender preselector brush 77, conductor 93, armature 86 and front contact of relay 30, lower windings of sensitive relay 87 and marginal relay 88, winding of relay 80, to grounded battery. Relays 87, 88 and 80 are operated and the register relays 87 and 88 close locking circuits through their upper windings, front contacts and armatures over conductor 31, to ground at the contact and armature of relay 25. When key No. 7 is released, relay 80 deenergizes and again completes a locking circuit for relay 81 (which was energized simultaneously with relay 80) from ground at the continuity spring and contact of relay 80, winding of relay 81, its front contact and armature, armature 82 and back contact of switching relay 26, armature 88 and front contact of relay 30, right-hand winding of the tens register switching relay 29 to grounded battery. The switching relay 29 attracts its armatures and closes two locking circuits for itself; the first extended from grounded battery, through its left-hand winding, front contact and armature, conductor 83, outer armature and front contact of relay 81 to ground, which circuit insures that the relay 29 will be held by its second locking circuit including its right-hand winding, front contact and armature through the back contacts and armatures of relays 28, 27 and 32 over conductor 31, to ground. The tens register is now in condition to be adjusted in accordance with the tens digit of the wanted number which in the case assumed is 6. The operator thereupon depresses key 6 to close one circuit from ground, through the resistance, key contacts 90, conductor 76, innermost armature and front contact of relay 21, sender preselector brush 77, conductor 93, armature 94 and front contact of relay 29, lower windings of the sensitive register relay 95 and marginal relay 96, through the winding of relay 80, to grounded battery. The sensitive relay 95 and the relay 80 are energized in this series circuit but the marginal relay 96 remains inert. On the operation of relay 95, a locking circuit is closed through its upper winding, front contact and armature, over conductor 31 to the holding ground. When the operator depresses numerical key No. 6, a second circuit is closed from ground, resistance, key contacts 90, conductor 91, lowermost armature and front contact of relay 21, sender preselector brush 92, conductor 85, outermost armature and front contact of the tens switching relay 29, upper windings of the sensitive relay 227 and marginal relay 228, conductor 103, to grounded battery through the winding of relay 80. The marginal relay 228 does not operate in the circuit but the sensitive relay 227 is energized and closes a locking circuit for itself through its lower winding, front contact and armature to the holding ground of conductor 31. On the energization of relay 80, an operating circuit is closed through the right-hand winding of relay 81 for operating it. This closes a temporary holding circuit from ground at the outer front contact and armature of relay 81, conductor 83, armature, front contact and left-hand winding of relay 29, to grounded battery over conductor 34. This circuit insures that the relay 29 will remain energized, until its locking circuit through its right-hand winding is completed. When the numerical key No. 6 is released, relay 80 deenergizes and a locking circuit is closed through the left-hand winding of relay 81, its armature and front contact, armature and back contact 82 of relay 26, armature and back contact 88 of relay 30, armature 97 and front contact of relay 29, right-hand winding of units register switching relay 28 to grounded battery. On the operation of this last named relay, locking circuits are closed for it as in the case of the other switching relays, previously mentioned. On the closure of the locking circuit through the right-hand winding of this relay, the relay 81 is again short-circuited and the units register is in condition to be adjusted in accordance with the units digit of the wanted number which, in this instance, is No. 4. The operator now depresses numerical key No. 4 and thereby closes a circuit from ground, through the contacts 98, conductor 99, upper armature and front contact of relay 21, sender preselector brush 100, conductor 101, right-hand armature and front contact of relay 28, lower winding of marginal relay 102, winding of relay 80 to grounded battery. Relays 102 and 80 are operated in this circuit. On the release of the No. 4 numerical key, the station's register switching relay 27 is energized and locked operated in a manner similar to the actuation of the other switching relays and the units register switching relay 28 deenergizes and the relay 81 of Fig. 1 is short-circuited, as previously described. Since the wanted subscriber is party R, the operator presses the party key for this party which, in this instance, is the same as the numerical key for No. 3. On the operation of this key a circuit is closed from ground, resistance, key contacts 104, conductor 76, innermost armature and front contact of relay 21, sender preselector brush 77, conductor 93, armature 105 and front contact of switching relay 27, lower windings of sensitive relay 165 and marginal relay 226, through conductor 103 and winding of relay 80 to grounded battery. The marginal relay 226 does not operate in series with the mentioned resistance, but the sensitive relay 165 attracts its armature and locks itself operated through its upper winding, front contact and armature to ground, over conductor 31.

In the event that the wanted number is an individual line without the party letter, the operation of the start key 108 functions the same as operating the key for party J which key operates relay 106 of the station's register. This will indicate to the B operator that station J is wanted and, when she operates the ringing key for party J, 33 cycle ringing current is selected which will signal the individual line. It will thus be seen that when the start key is operated on a call for a party line other than party J, relay 106 will not be operated because of the fact that the operation and release of a key to operate a relay of the station's register releases the relay 27 so that any subsequent operation of the numerical keys will not effect the adjustment of any of the registers.

After the A operator has adjusted the numerical registers in accordance with the designation of the wanted number, the start key 108 is depressed and held until the indicator pilot lamp 109 of Fig. 1 is lighted. The lighting of the lamp 109 is effected by the closure of the circuit including the conductor 111 which is closed at the left-hand armature and front contact of relay 110 which relay is operated as will now be described. On the depression of the start key, a circuit is closed from grounded battery, resistance, upper contact of start key 108, winding of relay 18, conductor 112, outer left-hand armature and front contact of relay 40 (which it will be remembered was energized as soon as the link finder of Fig. 1 had seized an idle link), left-hand winding of relay 110, through the back contacts and continuity springs of other relays similar to relay 110 of other positions located at link finders operated from the "Main" office keys, to ground. It will thus be seen that if no other operator has a start key similar to 108 depressed on a call to the "Main" office, relay 110 will operate and lock itself operated through its continuity spring, armature and right-hand winding and uppermost armature and front contact of relay 17. Relay 110 on attracting its armatures breaks the series ground circuit which is arranged so that no other operator can disturb the connection under completion until the operator in attendance on the present call has released her start key and then only one operator can effect the operation of the relay corresponding to 110 at another position. When 110 attracts its armatures in the manner described, it closes a circuit to light the indicator pilot lamp as previously described which informs the operator that the cord circuit in her position is associated with the common indicator board shown in the upper left-hand corner of Fig. 2. Relay 110 at this time also closes a circuit to operate relay 113 which circuit is traceable from grounded battery, winding of this relay, conductor 114, link finder brush 43, left-hand front contact and armature of relay 110 to ground. Relay 113 is thus operated and closes an actuating circuit for relays 37, 116 and 117 extending from grounded battery, right-hand winding of relay 37, innermost front contact and armature of relay 113, uppermost front contact and armature of relay 47, armature and back contact of relay 115, trunk finder brush 52, winding of sensitive relay 116, winding of marginal relay 117, front contact and armature of relay 55 (which was energized in series with relay 47) to ground. The operation of relay 117 is effective to light the tens and units lamps on the indicator board to indicate the trunk designation of the trunk assigned for use, into the jack of which 118 the operator will insert the calling plug 119 of her cord circuit. In the drawing this trunk is shown as trunk No. 12 and the marginal relay 117 completes circuits to light the tens lamp 120 and the units lamp 121. On receiving this number indication, the operator inserts the calling plug 119 of the cord circuit taken for use into the jack 118 and releases the start key 108 which extinguishes the lamps on the common indicator board as will be pointed out. When the start key 108 is released, at its upper contacts it opens the circuit which has been locking the relay 17 operated and since the relay 18 is slow to release its armature, the original locking circuit of relay 17 is open at the continuity spring and contact of relay 18. Therefore the relay 17 deenergizes and as soon as it retracts its armatures, it opens the locking circuit for relay 110 which extended through the uppermost front contact and armature of relay 17 and relay 110 on deenergization causes relay 113 to release its armatures. Also at the lower armature and contact 124 of relay 17, the energizing circuit of relay 39 is interrupted and this relay releases its armatures and thereby causes the deenergization of relay 47. The operator's circuits and the link finder which has just been in use are now in normal condition and in readiness for use on a subsequent call.

When relay 113 of the trunk finder is released, as above described, the low resistance winding of relay 37 is disconnected from the windings of the sensitive relay 116 and marginal relay 117 of the trunk circuit. Relay 37 and relay 116, however, do not deenergize because of a circuit extending from grounded battery through both windings in series of relay 37, its inner front contact and armature, armature and back contact of relay 115, trunk finder brush 52, relays 116 and 117, to ground at the front contact and armature of relay 55. Because of the high resistance winding of relay 37 now included in this circuit, the marginal relay 117 deenergizes and extinguishes the lamps on the indicator board which have been lighted for indicating the trunk assignment. Relay 37 now holds the trunk finder busy and also causes the sensitive relay 116 of the trunk and the relay 57 of the sender finder to remain operated. Since the calling plug 119 of the A operator's cord circuit, is in engagement with the jack contacts 118 of trunk No. 12, the relay 55 shown at the right of Fig. 1 is held operated from grounded battery, through the sleeve contacts of the mentioned plug and jack and winding of the relay 55 to ground over conductor 218, at the armature and back contact of a relay similar to 55 at another trunk of this group. Relay 55 while operated, indicates that trunk No. 12 is in use.

When the common set of numerical keys of an operator's position such as that shown at the lower left-hand corner of Fig. 1 is released, it is immediately connected to an idle register sender of the common group of register senders of which there are only enough provided to handle simultaneously calls to all offices, during the interval that transpires between the depression of the office key by the A operator, until the number indication has been transferred to the B operator's number indicator. It will be recalled that when relay 18 was energized at the close of the operation of the numerical keys, relay 14 deenergized. This closed an energizing circuit for relay 13 as long as preselector brush 24 tested test contacts having a busy potential applied at the armature and front contacts of relays similar to relay 65 at engaged register senders. With relay 13 operated, motor magnet 20 advances the preselector brush to select an idle register sender.

As soon as the number has been set up on the key set in the manner indicated and when the start key is operated, the operator receives the trunk assignment by the lighting of trunk indicator lamps, such as 120 and 121 on the common indicator board and thus it is not necessary for this trunk assignment to be transmitted to the A operator from the B operator's position over an order wire.

It will be understood that the registers of a register sender remain adjusted to store up the number designation of the wanted number until the B operator is in readiness to receive this indication on the number indicator shown at the right of Fig. 2 and at the lower part of Fig. 3, thus it is not necessary for the A operator to repeat the wanted number to the B operator. It will be pointed out in this description how the wanted number is displayed on the indicator at the B position until the B operator is in readiness to attend to the call and it remains as a visual indication of the wanted number until the B operator extinguishes the operated number indicating lamps either by operating a common release key 125 or by inserting the plug 126 into a multiple jack 127 of the wanted line.

The B operator receives an indication that a connection is wanted over selected trunk No. 12 when the A operator depresses the start key 108 of Fig. 1, which operation closes a circuit from ground, winding of relay 129 of Fig. 2, sender brush 130 in its normal position, conductor 131, sender finder brush 60, lowermost front contact and armature of relay 57, conductor 132, trunk finder brush 50, uppermost front contact and armature of relay 116, tip conductor 133 of the assigned trunk, uppermost armature and back contact of relay 134, winding of the repeating coil and winding of relay 135, to grounded battery. Relays 129 and 135 are both operated, relay 129 closing a circuit to advance the sender switch into its zero position. This circuit is traceable from ground, armature and front contact of relay 129, sender brush 136, conductor 137, back contact, armature and winding of motor magnet 126 of the sender switch, to grounded battery. The operation of relay 135 closes a circuit for operating the slow releasing relay 138 and this relay connects the lamp 139 in circuit with the intermittently closed contacts 140 of the common flashing device, this circuit being traced from grounded battery, through the lamp 139, inner armature and front contact of relay 138, armature and back contact of relay 141, conductor 142, contacts of the flasher 140, to ground. On noting that lamp 139 is intermittently lighted, the operator presses the assignment key 143 and thereby closes a circuit for operating the relay 134 which extends from ground, through the contacts of this key, upper winding of relay 134, conductor 144, receiver brush 145 in its normal position, armature, back contact and winding of the motor magnet 146, to grounded battery. This circuit is effective to cause the energization of the relay 134 which thereupon closes a locking circuit for itself from grounded battery, contacts on the release key 125, conductor 147, winding of relay 148, conductor 149, lower winding, front contact and armature of relay 134, conductor 150, to ground at the inner armature and back contact of relay 151. The guard lamp 152 is energized in multiple with this last described circuit. Relay 148 is operated in the locking circuit just described and closes an operating circuit for the motor magnet 146 of the receiver switch to advance it into position 1. This circuit is traceable from grounded battery, winding of motor magnet 146, its back contact and armature, receiver brush 145 in its normal position, right-hand front contact and armature of relay 148 to ground. As soon as the receiver switch moves out of its normal position, no other relay such as 134 can be operated by falsely pressing another assignment key, because the battery potential through the winding of the motor magnet 146 is removed from these relays when the receiver switch leaves its normal position. The operation of relay 134 also disconnects the tip and ring conductors 133 and 153 from the B operator's cord circuit and connects these conductors to the brushes 154 and 155 of the receiver switch. The opening of conductor 133 causes relay 135 to deenergize and also effects the deenergization of relay 129, which in turn advances the sender switch into position 1.

It will now be explained how the receiver and sender switches are advanced step-by-step in synchronism and how the number designation recorded on the relay registers at the A operator's position is effective to actuate corresponding relays at the B operator's position of the wanted office. The station's designation is transferred to the relays of the B operator's position first so that this operator can depress the station's key while the remainder of the wanted number designation is being received. Since the receiver and sender switches step alternately and since each switch must complete twenty-one steps to effect the number designation at the registers of the B operator's position, the total number of steps taken by both of these switches is forty-two and will require about one second of time to display the complete designation of the wanted line, after the B operator presses the assignment key 143.

It will be remembered that the sender and receiver switches are each in position 1 so that a circuit is now extended from ground, winding of relay 160, conductor 161, brush 154, uppermost front contact and armature of relay 134, tip conductor 133 of the selected trunk, uppermost armature and front contact of relay 116, trunk finder brush 50, conductor 132, lowermost armature and front contact of relay 57, sender finder brush 60, conductor 131, brush 130 in position 1, conductor 162, upper front contact of relay 106, but, since relay 106 was not operated, this circuit is incomplete at this point. At this time a circuit is closed from ground through the low resistance winding of relay 166, brush 155, inner upper armature and front contact of relay 134, ring conductor 153, of the trunk selected, inner upper armature and front contact of relay 116, trunk finder brush 51, conductor 167, armature and front contact of relay 57, sender finder brush 59, brush 168 in position 1, through both windings in series of relay 169, to grounded battery. The relay 166 will not operate in series with the high and low resistance windings of relay 169 but this last mentioned relay will be energized to close a circuit for advancing the sender switch to position 2. This circuit may be traced from grounded battery, winding of the motor magnet 126 of the sender switch, armature and back contact of this magnet, conductor 137, brush 136 in position 1, front contact and armature of relay 169, to ground. In position 2 of the sender switch, the low resistance winding of relay 169 alone is connected through brush 168 and sender finder brush 59 to the ring conductors 153 of the selected trunk through brush 155 and low resistance winding of the relay 166, to ground. Relay 166, is energized in this circuit and causes the motor magnet 146 of the receiver switch to be advanced in a circuit traceable from grounded battery, winding, back contact and armature of this magnet, brush 171 in position 1, front contact and armature of relay 166, to ground. In position 2 of the receiver switch, the relay 192 is connected to the station's register of the A office over a circuit extending from grounded battery, conductor 231, winding of relay 192, conductor 232, receiver brush 154 in its second position, uppermost front contact and armature of relay 134, tip conductor 133 of the selected trunk, upper armature and front contact of relay 116, trunk finder brush 50, conductor 132, lowermost armature and front contact of relay 57, sender finder brush 60, conductor 131, sender switch brush 130, in its second position, conductor 234, but this circuit is incomplete at the upper front contact and armature of relay 107 so that relay 192 is not operated. While the receiver switch is in position 2, the high resistance winding of relay 166 is connected in series with the low resistance winding of relay 169 at the sender switch, causing this last mentioned relay to deenergize while the relay 166 at the receiver switch remains operated. The sender switch is now advanced to position 3 in a circuit traceable from grounded battery, winding of its motor magnet 126, armature and back contact of this magnet conductor 137, brush 136, conductor 170, back contact and armature of relay 169, to ground. In position 3 of the sender switch a circuit is closed from ground through both windings of relay 173, brush 168 of the sender switch, brush 59 of the sender finder switch, middle contact and armature of relay 57, conductor 167, trunk finder brush 51, inner front contact and armature of relay 116 over ring conductor 153 of the trunk, inner armature and front contact of relay 134, receiver switch brush 155 in its second position, through both high and low resistance windings of relay 166, to ground. The relay 166 deenergizes and thereby completes a circuit for the motor magnet 146 to advance the receiver switch into position 3. As soon as the receiver switch enters this position, a circuit is closed for operating relay 193, extending from ground, winding of this relay, conductor 235, receiver switch brush 154, uppermost front contact and armature of relay 134, tip conductor 133 of the selected trunk, uppermost armature and front contact of relay 116, trunk finder brush 50, conductor 132, lowermost armature and front contact of relay 57, sender finder brush 60, conductor 131, sender switch brush 130, conductor 236, lowermost front contact and armature of relay 165, resistance to grounded battery. The relay 193, when operated, closes a locking circuit for itself from ground, through its winding, front contact and armature over conductor 237 to locking battery. The station's lamp 164 is lighted in multiple with this last described circuit of relay 193. A circuit is also closed from battery, through the low resistance winding of relay 172, brush 155, over the circuit previously described to brush 168 of the sender switch in position 3, through the high and low resistance windings of relay 173, to ground. Relay 173 is operated in this circuit and at its front contact and armature closes an operating circuit for the motor magnet 126 which advances the sender switch into position 4. In this position, the low resistance winding of relay 173 is connected to trunk conductor 153 to energize relay 172, which closes an operating circuit for magnet 146 of the receiver switch for advancing this switch into position 4. The high resistance winding of relay 172 is now included in the circuit extending over trunk conductor 153, and through the low resistance winding of relay 173 which causes this last named relay to deenergize and advance the sender switch into position 5, where battery potential is extended through both windings of relay 169, brush 168, sender finder brush 59, front contact and armature of relay 57, conductor 167, trunk finder brush 51, front contact and armature of relay 116, conductor 153, inner armature and front contact of relay 134, brush 155, through both windings of relay 172, to battery potential. This causes relay 172 to deenergize and advance the receiver switch into position 5. This alternate operation of the sender and receiver switches continues, until both switches are advanced to position 21.

It will be seen that the brush 154 of the receiver connects the twenty relays, A to T inclusive, of the indicator successively to the tip conductor 133 of the selected trunk as the receiver switch advances its brushes through positions 1 to 20, inclusive. The brush 130 of the sender switch connects the mentioned tip conductor 133 of the selected trunk successively to corresponding relays of the registers and the register relays which have been operated in response to the depression of the numerical keys will close circuits to operate and lock corresponding relays at the indicator at the wanted office. It should be noted that the relays of the register sender and of the indicating device are so connected to the various contacts of the sender switch and receiver switch, that as these switches are advanced, current is reversed in the signaling circuit, in each succeeding position of these switches. In this way the "overlap", when the sender switch moves, will not falsely operate a relay at the wanted office.

In the case assumed, relays A, B, E, F, I, K, N and Q of the sender registers were locked operated in response to the depression of the proper keys of the numerical key set and, after the operation of the sender and receiver switches has taken place, corresponding relays will be energized and locked operated in the receiver of the distant office. With these last mentioned relays operated, circuits can readily be traced for lighting only the station's lamp R, thousands' lamp No. 7, hundreds' lamp No. 7, tens' lamp No. 6 and units' lamp No. 4.

When the sender switch reaches position 21, a circuit is closed from grounded battery, winding of magnet 126, conductor 137, brush 136, conductor 180, sender finder brush 58, upper armature and front contact of relay 57, winding of relay 115, to ground. The magnet 126 remains inert, but the relay 115 is operated to open the operating circuit of the relay 116 of the trunk and the operating circuit of relay 37 of the trunk finder. Relay 37 in turn opens the holding circuit of relay 57 of the sender finder switch and the relay 65 of the sender which relay in turn causes relay 25 to deenergize. When relay 25 retracts its armature, it closes a circuit from ground, through the sender switch brush 128, conductor 127, back contact, armature and winding of motor magnet 126 to grounded battery and thereby advances the sender switch into its normal position, while the relay 25 at its front contact opens the locking circuit which has been holding the actuated relays of the registers in operated position. The trunk finder and the sender finder remain in the position last used.

After the lighting of the indicator lamps at the distant office, the B operator notes the designation of the wanted line and tests the multiple of the wanted line in the well known manner and, if this line is idle, inserts the plug 126 into the multiple jack 127 of this line. This last operation actuates the sleeve relay 151 which thereupon opens the conductor 150 by which the relay 134 and relay 148 have been held operated. Relay 134 deenergizes and extends the conductors 133 and 153 of the selected trunk through the windings of the repeating coil of the B operator's cord circuit. The relay 148 upon deenergizing closes a circuit from ground, through its armature and back contact, brush 145 of the receiver switch, armature, back contact and winding of the motor magnet 146 to grounded battery which circuit is effective to advance the receiver switch to its normal position.

The B operator, after inserting the plug 126 into the multiple jack 127 of the wanted line, depresses the party key 190 for connecting ringing current of the proper frequency to signal the wanted subscriber's station. The depression of key 190 also closes contacts 241 which close a circuit for the ringing relay 242 from grounded battery, resistance, upper winding of this relay, contacts 241 of the ringing key, back contact and armature of relay 141, uppermost front contact and armature of relay 138, to ground. Relay 242 is actuated in this circuit and locks itself operated from a circuit closed from grounded battery, its lower winding, front contact and armature, to ground at the uppermost front contact and armature of relay 138. The relay 141 is operated in multiple with the last described circuit through its continuity spring and contact and, when operated, closes a locking circuit for itself through its continuity spring and armature. As soon as the relay 242 is operated, it closes a ringing circuit from the source of current through the depressed party key 190 and in series through the back contacts of keys 189 and 188, conductor 243, lower front contact and armature of relay 138, winding of trip relay 244, upper front contact and armature of ringing relay 242 through the lower side of the operator's cord circuit and called line in series, through the tuned ringer at the B subscriber's station over the upper side of this line and the operator's cord circuit in series to ground at the uppermost armature and front contacts of ringing relay 242. When the called party responds, the trip relay 244 attracts its armature to short-circuit the ringing relay 242 which thereupon opens its locking circuit and remains inert to prevent inadvertent reapplication of signalling current on this connection. Also, when the ringing relay 242 retracts its armatures, it completes a circuit for the supervisory relay 243 through which talking battery is supplied to the wanted subscriber. The supervisory relay is maintained operated in this circuit and closes a circuit to apply supervisory battery to the answering end of the B operator's cord circuit through the winding of relay 135 and impedance coil 246.

It has not been deemed necessary to fully disclose the details of the operators' cord circuits by which supervision is obtained since these operations take place in the same manner as in multi-office telephone systems now in use. It will be sufficient to understand that at the termination of the conversation, proper signals will be displayed to the A and B operators who thereupon manually restore the cord circuits which have been in use.

It should be pointed out that the B operator can increase the speed of completing connections at her position by operating the common release key 125, as soon as she has noted the designation of the wanted line instead of waiting for the release operation of the receiver relay registers to be effected by inserting the plug 126 into the multiple jack 127.

By arranging the incoming trunk circuit with a so-called automatic busy test arrangement, that is, an arrangement wherein the operator does not have to test the multiple of a wanted line but simply inserts the plug of her cord circuit into a multiple jack of this line whereupon automatic means completes the connection, if the wanted line is idle, and prevents the completion of this connection, if the wanted line is engaged, the B operator need not be provided with a telephone set. While in this disclosure manual party keys have been disclosed for selecting the current of proper frequency for selecting wanted stations on a party line, it will be understood that the system herein disclosed will be equally effective, if the signalling current is selected automatically.

What is claimed is:

1. In a telephone system, an operator's position, telephone lines terminating in said position, a second operator's position, other lines terminating thereat, trunk circuits connecting said positions, a trunk indicating device at said first position, a line indicating device at said second position, means at said first position whereby an operator receives the designation of wanted lines, means controlled at said position for initiating a connection to a wanted telephone line, means responsive thereto for selecting an idle trunk to said second operator's position and for causing said trunk indicating device to give the trunk indication of the selected trunk line at said first operator's position, a circuit for connecting the calling line and the selected trunk, means controlled at said first position for causing said line indicating device to give the designation of the wanted line, and a manual switch by means of which an operator at said second position connects the selected trunk to the wanted telephone line.

2. In a telephone system, a plurality of operators' positions, each provided with a numerical key set, a plurality of senders common to said positions, means for allotting senders for use, means controlled at an operator's position for associating its numerical key set with an allotted sender whereby said sender is variably adjusted in accordance with a predetermined code, other operator's positions each provided with an indicating device, and means under the control of a sender for operating an indicating device in accordance with the adjustment of said sender.

3. In a telephone system, a plurality of offices, a plurality of trunk circuits connecting one office with a second office, a plurality of senders at said first office, means for preselecting a sender for use ahead of the call, a plurality of switches, a link circuit terminating at one end in a switch for selecting a trunk circuit and terminating at its other end in a switch for seizing a preselected sender, a third switch for seizing an idle link circuit, means for variably adjusting a selected sender, and means for transmitting impulses through said first and second mentioned switches to the selected trunk.

4. In a telephone system, a plurality of offices, trunk circuits connecting one office with a second office, a plurality of senders, means for preselecting a sender for use ahead of the call, a plurality of switches, means for variably adjusting a preselected sender in accordance with a predetermined code, a link circuit terminating at one end in a switch operating to seize a trunk circuit, said link circuit terminating at its other end in a switch for seizing a preselected sender, a third switch for seizing an idle link circuit and thereby effect the operation of said first and second switches, an indicating device at the second office, and means controlled by said adjusted sender and controlled through said first and second switches over a selected trunk for selectively operating said indicating device.

5. The method of completing a telephone connection which consists in the subscriber repeating the number of the wanted line to an operator, said operator thereupon manually selecting the office through which a wanted subscriber can be reached, selecting a trunk to said office, visually signalling the designation of the selected trunk to said operator, said operator then connecting the calling subscriber and the selected trunk, visually signalling the number of the wanted subscriber to a second operator, and connecting the wanted line to the designated trunk.

6. In a telephone system, a plurality of offices, an A operator's position at one of said offices, B operators' positions at the other offices, trunks for connecting said A operator's position to each of said other offices, office keys one for each office accessible to said A operator's position, and means responsive to the operation of an office key for automatically selecting a trunk to a wanted office and for automatically indicating the designation of said trunk to said A operator's position.

7. In a telephone system, a plurality of telephone offices, an A operator's position at one of said offices, B operators' positions at the other offices, trunks for connecting said A operator's position to said other offices, office keys one for each office accessible to said A operator's position, automatic switching means operating responsive to the operation of one of said keys for automatically selecting trunks to a wanted office, and automatic indicating means for giving the designation of selected trunks.

8. In a telephone system, a plurality of telephone offices, a plurality of A operators' positions at one of said offices, B operators' positions at each of said other offices, trunks leading from said A operators' positions to each of said other offices, an office key at each A operator's position for each office reached from said A operators' positions, a trunk indicator at said A operators' positions, a number indicator at each of said distant offices, a plurality of senders common to said operators' positions and variably adjusted therefrom, and means responsive to the adjustment of said senders for selectively operating said number indicators.

9. In a telephone system, two telephone offices, an A operator's position at one of said offices, a B operator's position at the other office, a register sender at the A operator's position comprising a group of registers arranged to be selectively operated under the control of the A operator, a progressively movable switch associated with said register sender, an indicating device at the B operator's position, a progressively movable switch associated therewith, and means for operating said switches alternately whereby the registration on said register sender is transferred to the indicating device at the B operator's position.

10. In a telephone system, an A operator's position, a register sender including a progressively movable switch located at said position, means at said position for variably adjusting said register sender in accordance with a predetermined code, a B operator's position, a trunk circuit connecting said operators' positions, an indicator at said B operator's position arranged to be variably operated in accordance with the setting of said register sender, a progressively movable switch associated with said indicator, means for setting said switches in operation, means effective thereafter whereby the switch associated with said indicator completes operating circuits for the switch associated with said register sender and means whereby the switch associated with the register sender closes operating circuits for the switch associated with said indicator, and means functioning during the advance of said switches for effecting the operation of the indicator in accordance with the adjustment of said register sender.

11. In a telephone system, a plurality of offices, a plurality of A operators' positions at one of said offices, a B operator's position at the other office, a plurality of register senders for the use of said A operators' positions arranged to be variably adjusted therefrom, means for associating an idle register sender with an A operator's position, each of said register senders being provided with a progressively movable sender switch, a trunk circuit connecting said A operators' positions and said B operator's position, an indicating device located at said B operator's position and a progressively movable receiver switch associated therewith, means for initiating the operation of said switches, other means effective thereafter whereby the receiver switch effects the advance of the sender switch, additional means whereby the sender switch effects the advance of said receiver switch, and means operating under the control of said switches whereby the register sender effects the operation of said indicator over said trunk circuit.

12. In a telephone system, a plurality of offices, a plurality of A operators' positions at one of said offices, a B operator's position at the other office, a single strip of keys at each A operator's position, a plurality of register senders for the use of said A operators' positions and arranged to be variably adjusted by said keys, means for associating an idle register sender with an A operator's position, each of said register senders being provided with a progressively movable switch, a trunk circuit connecting said A operators' positions and said B operator's position, an indicating device located at said B operator's position, a progressively movable receiver switch associated therewith, means for initiating the operation of said switches, other means effective thereafter whereby the receiver switch effects the advance of the sender switch, additional means whereby the sender switch effects the advance of said receiver switch, and means operating under the control of said switches whereby the register sender effects the operation of said indicator over said trunk circuit.

13. In a telephone system, a plurality of offices, a plurality of A operators' positions at one of said offices, a B operator's position at the other office, a plurality of register senders for the use of said A operators' positions arranged to be variably adjusted therefrom, means associated with each A operator's position for preselecting an idle register sender, each of said register senders being provided with a progressively movable sender switch, a trunk circuit connecting said A operators' positions and said B operator's position, an indicating device located at said B operator's position and a progressively movable receiver switch associated therewith, means for initiating the operation of said switches, other means effective thereafter whereby the receiver switch effects the advance of the sender switch, additional means whereby the sender switch effects the advance of said receiver switch, and means operating under the control of said switches whereby the register sender effects the operation of said indicator over said trunk circuit.

14. In a telephone system, a plurality of offices, a plurality of A operators' positions at one of said offices, a B operator's position at the other office, a plurality of register senders for the use of said A operators' positions, each of said register senders including a plurality of relays arranged to be variably adjusted from said operators' positions, means for associating an idle register sender with an A operator's position, each of said register senders being provided with a progressively movable sender switch, a trunk circuit connecting said A operators' positions and said B operator's position, an indicating device located at said B operator's position and a progressively movable receiver switch, associated therewith, means for initiating the operation of said switches, other means effective thereafter whereby the receiver switch effects the advance of the sender switch, additional means whereby the sender switch effects the advance of said receiver switch, and means operating under the control of said switches whereby the register sender effects the operation of said indicator over said trunk circuit.

15. In a telephone system, a plurality of operators' positions, each of said positions being provided with a single set of keys, a plurality of number storing devices for the common use of said positions and arranged to be variably adjusted in accordance with the operation of said key set, and a progressively movable preselector switch for each operator's position for associating the key set of that position with an idle register sender.

16. In a telephone system, an A operator's position, a B operator's position, telephone lines terminating at each of said positions, a trunk circuit extending between said positions, a register sender in said A operator's position arranged to be variably actuated in accordance with the designation of a wanted telephone line, an indicating device at said B operator's position, and means having a signaling circuit including at least one of the conductors of said trunk circuit for transferring the designation recorded on said register sender to said indicating device, said means including mechanism for reversing the direction of current flow in said signaling circuit a plurality of times during the transfer of the designation from said register sender to said indicating device.

17. In a telephone system, an A operator's position. a B operator's position, telephone lines terminating in said positions, a trunk circuit extending between said positions, a register sender at said A operator's position arranged to be actuated in accordance with the designation of a wanted telephone line, an indicating device at said B operator's position, a signaling circuit including at least one conductor of said trunk circuit for transferring the designation of said register sender to said indicating device, means at said B operator's position for connecting said trunk circuit to the indicated line, and two means for releasing said register sender and said receiving device prior to the termination of the connection.

18. In a telephone system, an A operator's position, a B operator's position, telephone lines terminating at each of said positions, a registering device located at said A operator's position and arranged to be actuated in accordance with the designation of a wanted telephone line, an indicating device located at said B operator's position, a signaling circuit including at least one conductor of said trunk circuit for transferring the designation of said wanted telephone line from said registering device to said indicating device, a release key, and switching means for connecting said trunk circuit to said wanted telephone line, said release key and said switching means being individually effective to release said registering and indicating devices.

19. In a telephone exchange system, a plurality of operators' positions, a plurality of outgoing trunks, each trunk terminating at its distant end in a manual connection terminal, mechanism associable with the distant ends of said trunks for indicating the numbers of wanted lines, a plurality of senders, a plurality of sender controlling equipments, a plurality of switching units common to said operators' positions, means to operate a switching unit to establish an interconnection between a sender controlling equipment, a sender and an idle trunk, and means to operate said mechanism over said trunk under the control of a sender in accordance with the operation of said sender controlling equipment.

20. In a telephone exchange system, a plurality of operators' positions, a plurality of outgoing trunks, each trunk terminating at its distant end in a manual connection terminal, mechanism associable with the distant ends of said trunks for indicating the numbers of wanted lines, a plurality of senders, a plurality of sender controlling equipments, a plurality of switching units common to said operators' positions, means to operate a switching unit to establish an interconnection between a sender controlling equipment, a sender and an idle trunk, means to indicate to an operator the number of the idle trunk selected, and means to operate said mechanism over said trunk under the control of a sender in accordance with the operation of said sender controlling equipment.

21. In a telephone exchange system, in combination, incoming lines, outgoing trunks, each trunk terminating at its distant end in a manually operable connection terminal, an operator's position, a cord circuit terminating at each end in a manually operable device for interconnecting an incoming line and an outgoing trunk, mechanism associable with the distant ends of said trunks for indicating the numbers of wanted lines, a plurality of variably operable senders for controlling said mechanism over said trunks independent of said cord circuit, and means at said operator's position to control the automatic selection of a trunk and to variably control the setting of said senders for controlling said mechanism.

22. In a telephone exchange system, in combination, incoming lines, outgoing trunks, each trunk terminating at its distant end in a manually operable connection terminal, an operator's position, a cord circuit terminating at each end in a manually operable device for interconnecting an incoming line and an outgoing trunk under the control of said operator's position, mechanism associable with the distant ends of said trunks for indicating the numbers of wanted lines, a plurality of variably operable senders for transmitting series of impulses of varying characteristics over said trunks for controlling said mechanism, and means at said operator's position to control the automatic selection of a trunk and of a sender and to variably control the setting of said senders for controlling said mechanism.

23. In a telephone exchange system, in combination, incoming lines, outgoing trunks, each trunk terminating at its distant end in a manually operable connection terminal, an operator's position, a cord circuit terminating at each end in a manually operable device for interconnecting an incoming line and an outgoing trunk under the control of said operator's position, means associable with the distant ends of said trunks for indicating the numbers of wanted lines, a plurality of senders for transmitting series of impulses of varying characteristics over said trunks for controlling said mechanism, registers in said senders for recording the digits of wanted line numbers, and means at said operator's position to control the automatic selection of a trunk and of a sender and for variably controlling the setting of said registers for controlling said mechanism.

24. In a telephone exchange system, a plurality of operators' positions, a plurality of outgoing trunks, each trunk terminating at its distant end in a manually operable connection terminal, mechanism associable with the distant ends of said trunks for indicating the numbers of wanted lines, a plurality of senders, a plurality of sender controlling equipments, a plurality of switching units common to said operators' positions, means to operate a switching unit to establish an interconnection between a sender controlling equipment, a sender and an idle trunk, means to operate said mechanism over said trunk under the control of a sender in accordance with the operation of said sender controlling mechanism, and means operative following the completion of the operation of said sender to release said switching unit.

25. In a telephone exchange system, a plurality of operators' positions, other operators' positions, a plurality of outgoing trunks, said trunks terminating at said latter positions in manually operable connection terminals, mechanism associable with the distant ends of said trunks for indicating the numbers of wanted lines, a plurality of senders, a plurality of sender controlling equipments, a plurality of switching units common to said first operators' positions, means to operate a switching unit to establish an interconnection between a sender controlling equipment, a sender and an idle trunk, means to operate said mechanism over said trunk under the control of a sender in accordance with the operation of said sender, controlling mechanism and means operative upon the response of a second mentioned operator to start said sender into operation.

26. In a telephone exchange system, a plurality of incoming lines, a plurality of outgoing trunks, each trunk terminating at its distant end in a manually operable connection terminal, means for interconnecting said lines and trunks, mechanism associable with the distant ends of said trunks for indicating the numerical designation of a desired line, a register sender, groups of relay registers for said sender, means for registering the numerical designation of a desired line on said registers, means associated with said sender for transmitting over said trunks a plurality of series of impulses of varying characteristics corresponding to the numerical designations registered upon said registers for controlling said mechanism, and means for changing the order of transmission of said series of impulses.

27. In a telephone exchange system, a plurality of incoming lines, a plurality of outgoing trunks, each trunk terminating at its distant end in a manually operable connection terminal, means for interconnecting said lines and trunks, mechanism associable with the distant ends of said trunks for indicating the numerical designation of a desired line, a register sender, groups of relay registers for said sender, means for registering the numerical and stations designations of a desired line on said registers, means associated with said sender for transmitting over said trunks, a plurality of series of impulses of varying characteristics corresponding to the designations registered on said registers for controlling said mechanism, and means for changing the order of transmission of said series of impulses in accordance with the operated condition of the relays of certain of said registers.

In witness whereof, I hereunto subscribe my name this 9th day of April, A. D. 1926.

WINFRED T. POWELL.